Sept. 6, 1966     B. SLOTNICK ETAL     3,271,607

WATERWHEEL DYNAMOELECTRIC MACHINE ROTOR

Filed Aug. 15, 1963     4 Sheets-Sheet 1

WITNESSES:
John L. Chopp
Edward F. Possessky

INVENTORS
Barney Slotnick and
Albert W. Latham
BY
ATTORNEY

Sept. 6, 1966  B. SLOTNICK ETAL  3,271,607
WATERWHEEL DYNAMOELECTRIC MACHINE ROTOR
Filed Aug. 15, 1963  4 Sheets-Sheet 3

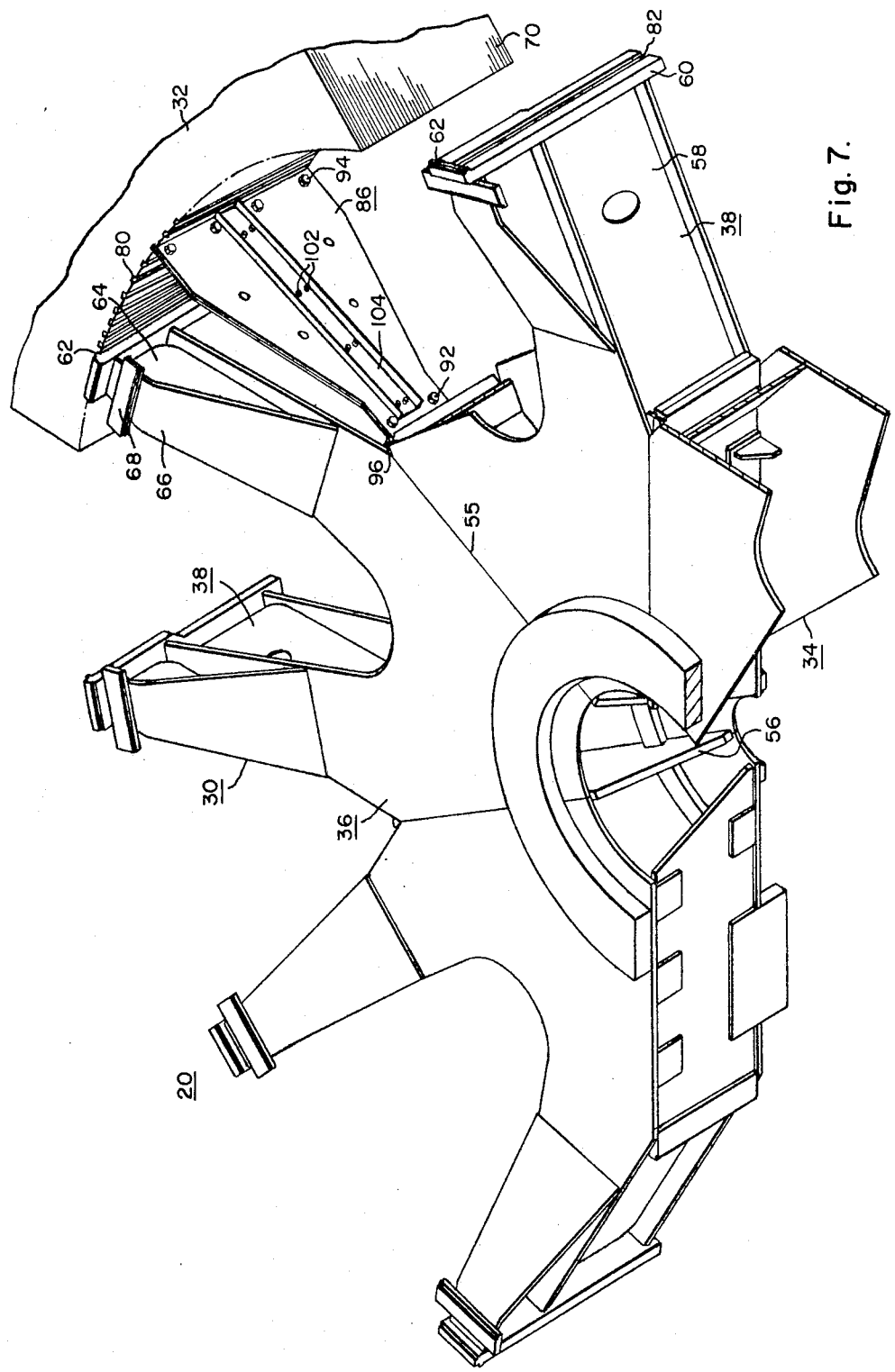

3,271,607
  ## WATERWHEEL DYNAMOELECTRIC MACHINE ROTOR

Barney Slotnick, Irwin, and Albert W. Latham, Murrysville, Pa., assignors to Westinghouse Electric Corporation, Pittsburgh, Pa., a corporation of Pennsylvania
  Filed Aug. 15, 1963, Ser. No. 302,416
  15 Claims. (Cl. 310—269)

The present invention relates to fluid driven or waterwheel dynamoelectric machine rotors and, more particularly, to such rotors having spider and rim members.

The driving power for such dynamoelectric machines is provided by fluid, usually water, and, accordingly, the speed at which the machine rotor is driven is ordinarily relatively small, for example 120 revolutions per minute. When such machines are used to generate alternating current having a frequency near or equal to 60 cycles per second, it is necessary that a relatively large number of salient poles be provided about the rotor periphery. In turn, the diameter of the rotor is necessarily made relatively large so that the rotor periphery can accommodate the large number of poles.

With the need for a large sized rotor, there has evolved a rotor structure comprising a rotor rim on which the salient poles are supported and a spider arrangement which provides support for the rim relative to a rotor shaft which receives drive power from a fluid or water turbine. In addition to pole support, the rotor rim also provides a magnetic path for pole flux. The spider structure provides rim support through a structural framework which eliminates the weight and cost of excess material associated with a solid supporting structure.

Tight securance of the rotor rim to the spider member is required for rotor structural integrity against counterrotational torques as well as generally for rotational balance. One manner in which this securance can be obtained is by expanding the rotor rim with heat followed by placement of the rotor rim about the spider member. Cooling of the rotor rim then results in its shrinkage about the spider member, but relatively large stresses build up in the spider member as a result of the shrinkage forces. To withstand the resulting stresses, the spider member by this method accordingly requires relatively thick and heavy framework sections and a corresponding element of manufacturing and operational inefficiency results.

In another securing arrangement, the rotor rim is disposed on the spider member at normal or other temperature, and tapered keys are driven between the rotor rim and the spider member. Although the tapered keys when finally positioned provide a solid securance of the rotor rim on the spider member, galling of the keys during placement and the amount of driving force required to obtain key placement characterize this securing arrangement as being cumbersome.

It is desirable that excess spider strengthening material occasioned by securance stresses be avoided and further that the spider and rim be readily securable together yet separable when desired after securance is obtained. Further, it is desirable that a rotor structure be such that adjustment be readily obtainable in the securance relation between the rotor rim and the spider member after preliminary securance is obtained. This would provide substantial assurance of obtaining circumferentially uniform distribution of securance forces between the rotor rim and the spider.

In order to realize these aims, it is necessary that a fresh approach to structurization of a waterwheel dynamoelectric machine rotor be employed. Thus, in accordance with the broad principles of the present invention, a rotor for a waterwheel dynamoelectric machine comprises a spider member securable to a shaft and a rim member disposable peripherally about the spider. Rigid support of the rim on the spider is provided by securance means including clamp means extending between the spider and the rim and being adjustable to provide tight rim securance after placement of the rim on the spider. When desired, the spider and rim can subsequently be readily separated by unclamping the clamp means.

Accordingly, it is an object of the invention to provide a novel dynamoelectric machine rotor having spider and rim members wherein the members are efficiently and rigidly secured together.

Another object of the invention is to provide a novel waterwheel dynamoelectric machine rotor having spider and rim members wherein the members are efficiently and rigidly secured together with relatively minimal securance stresses produced in the spider so that economy in spider material thickness is provided.

A further object of the invention is to provide a novel waterwheel dynamoelectric machine rotor having spider and rim members wherein the members are efficiently and rigidly secured together and wherein the members are readily separable if desired after securance.

An additional object of the invention is to provide a novel waterwheel dynamoelectric machine rotor having spider and rim members wherein the members are efficiently and rigidly secured together with adjustable clamp means such that support forces are substantially uniformly distributed peripherally about the rotor.

These and other objects of the invention will become more apparent upon consideration of the following detailed description along with the attached drawings, in which:

FIG. 7 shows a bottom perspective view of a portion of the rotor of FIG. 2.

Figure 1:
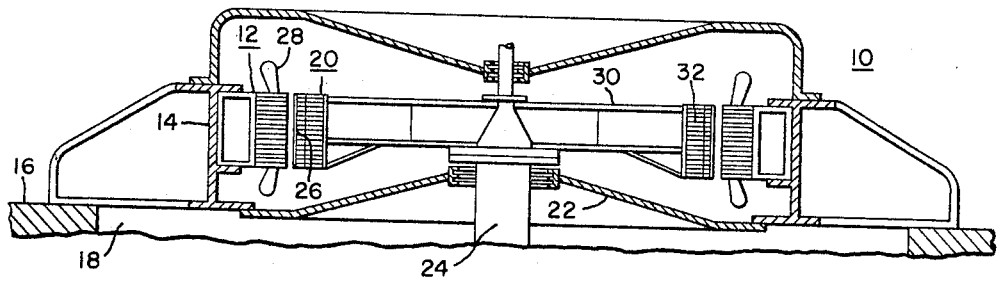
FIGURE 1 shows a portion of a vertical section of a waterwheel dynamoelectric machine or generator constructed in accordance with the principles of the invention.

More specifically, there is shown in FIG. 1 a vertical hydroelectric or waterwheel dynamoelectric machine or generator 10 illustratively embodying the principles of the invention. The generator 10 comprises a stator structure 12 which is disposed on a frame or housing 14. The latter in turn rests on a foundation 16 which surrounds a pit 18 wherein a fluid or water turbine (not shown) is suitably disposed for driving a rotor 20 of the generator 10.

The rotor 20 is disposed within the stator structure 12 and suitably rotatably mounted with thrust support on a support member 22. A shaft 24 couples the rotor 20 to the aforementioned fluid turbine to obtain driving power for rotor rotation. When pole winding means 26 of the rotor 20 are suitable energized, electric energy is then generated in windings 28 of the stator structure 12.

In addition, the rotor 20 comprises a structural framework in the form of a spider member 30 keyed or otherwise suitably engaged with the shaft 24 and a rim member 32 which is peripherally supported on or secured to the spider 30. A structural arrangement such as this is particularly needed for economy in weight and material if the rotor diameter is relatively large. In hydroelectric or waterwheel generators, this is usually the case since a large number of poles are required about the rotor periphery in order to generate, for example, 60 cycle electric energy in the generator stator.

In this case, the spider 30 comprises an upper spider plate portion 34 (FIGS. 2 and 7) and a lower spider plate portion 36 secured in spaced relation by means of transverse plate means 38 and formed from structural steel for example. Each spider plate portion 34 or 36 comprises a plurality of plate arms 40 and 42 or 44 and 46, extending radially outwardly from a central portion 48 or 50 and, further, can be machined as a single piece or as half pieces securable together during rotor assembly. On the other hand, as shown here, the spider portions 34 and 36 can be formed from a plurality of respective plate pieces 52 and 54 by means of welding or the like as indicated by the reference character 55.

The transverse plate means 38 are also preferably formed from structural steel and arranged to produce the strength and rigidity required for the spider 30. Thus, the plate means 38 include a generally radially extending plate 56 secured or welded transversely between the spider plate portions 34 and 36 along the line of jointure of each of peripherally successive pairs of arms 40 and 42 or 44 and 46 (six, in this instance) or along the line of jointure of adjacent plate components 52 or 54. In turn, an arm support plate 58 is secured or welded transversely between each opposed pair of plate arms 40 and 44, or 42 and 46, and is extended along such arms or angularly outwardly from the associated radial plate 56 to a rim support member 60 secured transversely across the outer ends of opposed arm pairs 40 and 44 or 42 and 46.

In order to aid in supporting the weight of the rim 32, each rim support member 60 is provided with a radially outwardly extending flange 62 adjacent its bottom end. Inward deflection of the bottom end of each rim support plate 60 and additional support for the rim 32 is provided by a transverse plate 64 and an associated bracket 66 secured or welded to each rim support member 60 and extending generally radially inwardly along and secured or welded to the adjacent plate arm 44 or 46 of the bottom spider plate portion 36. A brake shoe 68 can be disposed on each bracket 66 so as to face downwardly for engagement with a brake ring (not shown) when it is desired to decelerate the rotor 20.

The rim 32 is preferably formed from laminated electrical steel as indicated by the reference character 70 and it is provided with an inner diameter sufficient in size for the rim 32 to fit over the rim support members 60 against the rim support member flanges 62. A plurality of slots 72 and 74 are provided about the outer periphery of the rim 32 for respective securance of pole pieces 76 and coolant or blower means 78. The pole winding means 26 are disposed on the pole pieces 76.

Figure 3:
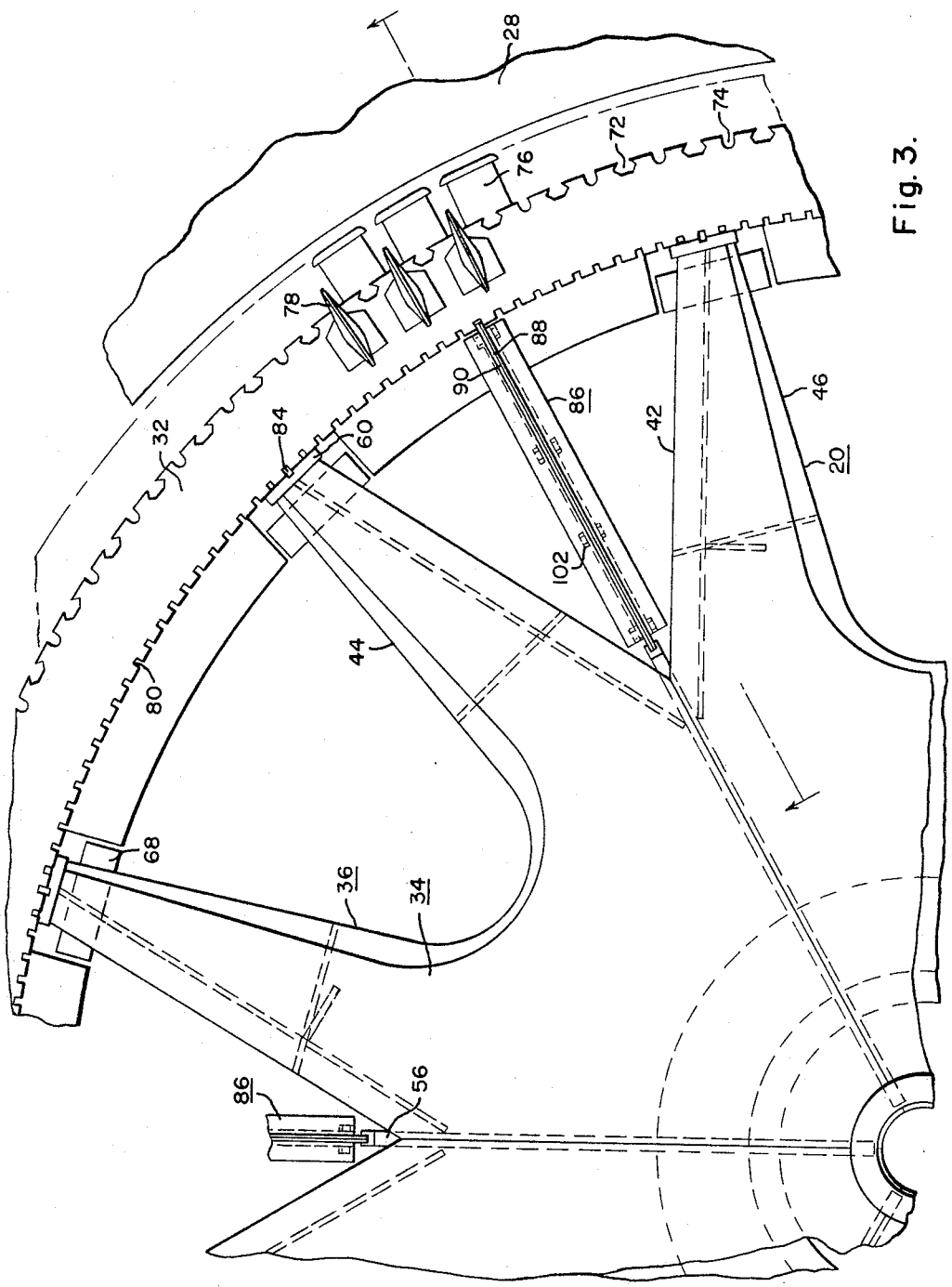
FIG. 3 shows a portion of an enlarged top plan view of the rotor of FIG. 2 in clamped condition.

When the rim 32 is disposed on the spider 30, it is positioned so that one of a plurality of slots 80 disposed about the inner periphery thereof is aligned with a corresponding slot 82 (FIG. 7) in each of the rim support members 60. A bar member 84 (FIG. 3) is then inserted in the mating slots 80 and 82 until limited in its ingoing movement by the associated support member flange 62. The resulting interengaging structure is effective to support the spider and rim members 30 and 32 against relative rotative movement particularly during accelerating or decelerating rotor movement.

Figure 2:
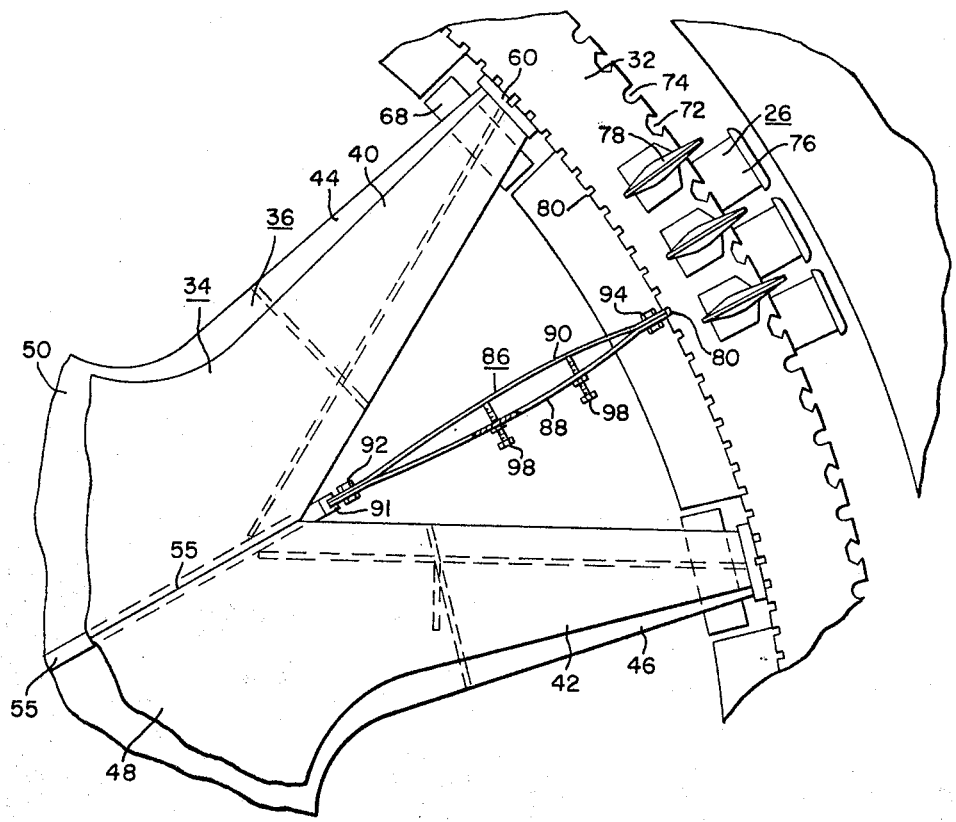
FIG. 2 shows a portion of an enlarged top plan view of an unclamped rotor member used in the generator of FIG. 1.

Rigid support of the rim 32 on the spider 30 is provided by a plurality of adjustable clamp means 86 insertable between the rim 32 and the spider 30 when unclamped as shown in FIG. 2. Thus, each clamp means 86 can comprise a pair of generally elongated plates 88 and 90 disposed in side-by-side relation and extending generally radially between a slot 91 in the end of each radial plate 56 and a radially opposed slot 80 in the rim 32, and the plates 88 and 90 are normally secured together by end bolts 92 and 94 respectively adjacent the spider and rim ends of the plates 88 and 90. The plate slot 91 can be terminated short of the bottom of the plate 56 as indicated by the reference character 96 in FIG. 7 so as to limit downward insertional movement of each clamp means 86.

Preferably, the bolted ends of the plates 88 and 90 are machined flat and parallel to each other. The distance between the finished ends of the plates 88 and 90 is preferably made equal to the radial distance from the plate slot 91 to the radially opposite rim slot 80 plus the amount required to make the necessary tight or "shrink" fit between the spider and rim members 30 and 32 with the plates 88 and 90 flat.

Figure 4:
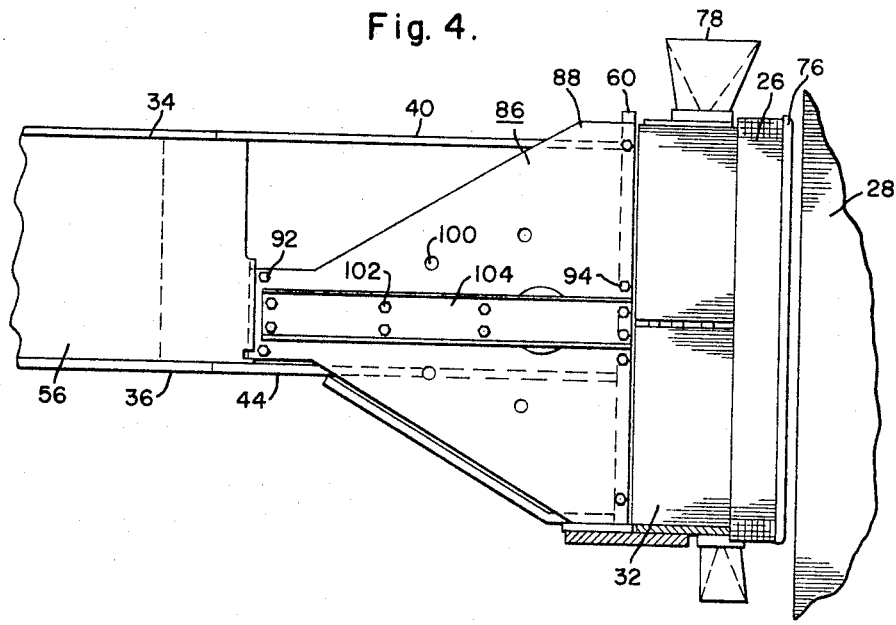
FIG. 4 shows a portion of an elevational view of the rotor of FIG. 2 as well as clamping means employed therein.
Figure 5:
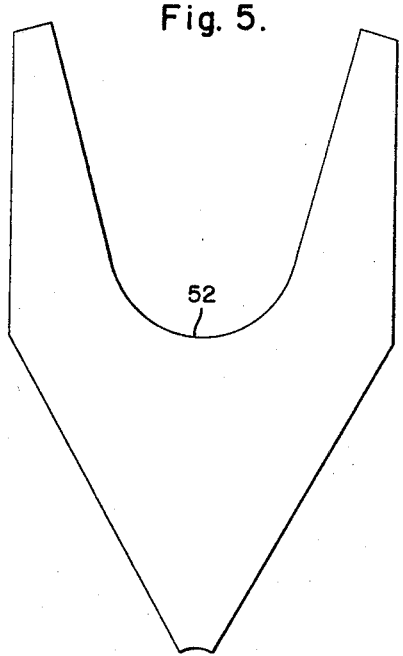
FIGS. 5 and 6 show respective plate segments from which a spider member of the rotor of FIG. 2 can be constructed.
Figure 6:
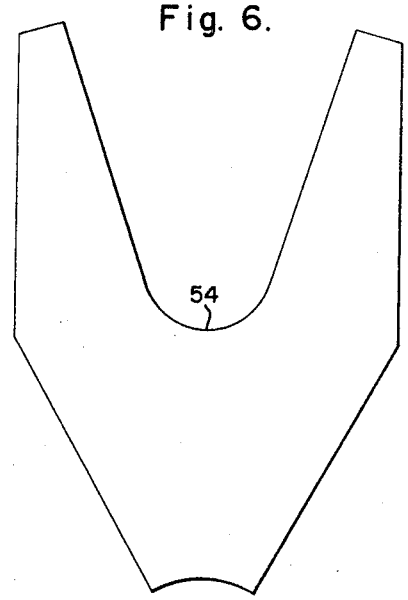

One or more jack bolts 98 (FIG. 2) inserted through plate openings 100 (FIG. 4) keep the plates 88 and 90 in bowed and unclamped or radially shortened condition so as to facilitate insertion and removal of the clamp means 86 between the spider 30 and the rim 32. Once the clamp means 86 are inserted along the radially opposite slots 91 and 80, the jack bolts 98 are removed and a plurality of bolts 102 are employed to clamp the plates 88 and 90 into a flush relationship. Rigid radial support is then provided for the rim 32 relative to the spider member 30 since the plates 88 and 90 are thus adjusted or increased in radial dimension to produce a tight fit, and such support is substantially uniformly provided about the rim periphery particularly if dimensional accuracy is obtained in component sizes. The clamp means 86 is thus radially extensible, after insertion, by tightening the bolts 102, and applies, or transmits, a radial clamping force between the spider and the rim. This clamping force is equivalent to the clamping force provided by the conventional shrink fit of the rim on the spider arms but can be more accurately controlled for uniform distribution of stress in the rim and to minimize distortion of the rim. Furthermore, by applying the clamping force between the rim and the plates 56, radial stresses in the spider arms are minimized permitting a lighter construction to be used for the arms.

However, if the fit of the rim 32 on the spider 30 is unsatisfactory in any respect, adjustment can be readily made by removing the bolts 102 in the appropriate clamp means 86 and inserting shim members (not shown) where required or otherwise suitably making adjustments. The adjusted clamp means 86 can then be retightened to provide the desired fit. Preferably, structural rigidity is substantially supplemented through the employment of a suitable beam 104, such as a U-beam, extending radially along each clamp means 86 and secured thereto by means of the bolts 102 during the completion of clamping action.

The only tool required to join or disjoin the spider and rim members 30 and 32 is a wrench, and efficiency is thus provided in the structurization of the rotor 20. The structural quality of the finished rotor 20 is excellent since the final shrink fit of the rim 32 on the spider 30 can be closely controlled for both the amount and distribution of shrink force. Excess shrink force is thus avoided and relatively minimal cross-section size can be employed for the spider plate portions 34 and 36 and the transverse plate means 38. Further, because of the readiness with which the clamp means 86 can be unclamped even after final assembly, the spider (and its shaft) can be easily removed from the generator 10 after its installation leaving the rim 32 in place inside the stator structure 28, as is now often required by customers.

The foregoing description has been presented only to point out the principles of the invention. Accordingly, it is desired that the invention be not limited by the embodiment described, but, rather, that it be accorded an interpretation consistent with the scope and spirit of its broad principles.

What is claimed is:

1. A rotor for a waterwheel dynamoelectric machine, said rotor comprising a rim member having flux producing means distributed about its outer periphery and a spider member having a pair of spaced spider portions, said spider portions having a plurality of generally mutually aligned radially extending arms, plate means extending transversely between said spider portions and supporting the same in spaced relation, said rim member disposed circumferentially about said spider member on said spider arms, and means for securing said rim member to said spider member, said securing means including respective radially extending clamp means engageably disposed between said rim member and a support portion of said plate means and located in the circumferential direction between the spider portion arms of each of successive spider portion arm pairs and adjustable in radial dimension to clamp said rim and spider members in rigid relation.

2. A rotor for a waterwheel dynamoelectric machine, said rotor comprising a rim member having flux producing means distributed about its outer periphery and a spider member having a pair of spaced spider portions, said spider portions having a plurality of generally mutually aligned radially extending arms, plate means extending transversely between said spider portions and supporting the same in spaced relation, a rim support plate extending transversely between said spider portions and disposed on an end portion of each spider arm of each aligned spider arm pair, said rim member disposed circumferentially about said spider member on said rim support plates, means providing interengagement between said rim member and each of said rim support plates so as to prevent relative rotation between said spider and rim members, respective radially extending clamp means engageably disposed between said rim member and a support portion of said plate means and located in the circumferential direction between the spider portion arms of each of successive spider portion arm pairs and adjustable in radial dimension to clamp said rim and spider members in rigid relation.

3. A rotor for a vertical waterwheel dynamoelectric machine, said rotor comprising a rim member having flux producing means distributed about its outer periphery and a spider member having spaced upper and lower spider portions, said spider portions having a plurality of generally mutually aligned radially extending arms, plate means extending transversely between said spider portions and supporting the same in spaced relation, a rim support plate disposed on an end portion of each spider arm of each aligned spider arm pair and extending transversely between said spider portions and below said lower spider portion, each of said rim support plates having an outwardly projecting horizontal flange adjacent its lower end, said rim member disposed circumferentially about said spider member on said rim support plates in engagement with said rim support plate flanges, additional plate means extending between a lower end portion of each of said rim support plates and said lower spider portion so as to support said rim support plates against inward deflection, means providing interengagement between said rim member and each of said rim support plates so as to prevent relative rotation between said spider and rim members, and respective radially extending clamp means engageably disposed between said rim member and a support portion of said plate means and located in the circumferential direction between the spider portion arms of each of successive spider portion arm pairs and adjustable in radial dimension to clamp said rim and spider members in rigid relation.

4. A rotor for a waterwheel dynamoelectric machine as set forth in claim 2, wherein said plate means include a radially extending plate having said spider support portion for said clamp means and further include a transverse arm plate extending outwardly between each opposed arm pair.

5. A rotor for a waterwheel dynamoelectric machine, said rotor comprising a rim member having flux producing means distributed about its outer periphery and a spider member having a plurality of radially extending arms, said rim member disposed circumferentially about said spider member on said spider arms, and means for securing said rim member to said spider member, said securing means including at least one pair of end bolted clamping plates engageably disposed between said rim member and a support portion of said spider member, means for separating the central portions of said clamping plates from each other to facilitate placement of said clamping plates between said spider and rim members in the radial direction, and means for clamping said plates together to clamp said rim and spider members in rigid relation.

6. A rotor for a waterwheel dynamoelectric machine as set forth in claim 5, wherein said clamping plate separating means include at least one jack bolt.

7. A rotor for a waterwheel dynamoelectric machine as set forth in claim 5, wherein said clamping plate separating means include at least one jack bolt and wherein a structural beam extending in the radial direction is secured to said clamping plates by said securing means when said spider and rim members are clamped in rigid relation.

8. A rotor for a waterwheel dynamoelectric machine as set forth in claim 1, wherein said clamp means include a pair of end bolted plates and means for separating the central portions of said plates so that the plates are adjustable in radial dimension, and means for clamping said clamping plates together.

9. A rotor for a waterwheel dynamoelectric machine as set forth in claim 1, wherein said clamp means include a pair of end bolted plates and at least one jack bolt for separating the central portions of said clamping plates and thereby adjusting the radial dimension of said clamping plates, means for securing said clamping plates together and a structural beam extending radially along said clamping plates and secured thereto by said securing means.

10. A rotor for a waterwheel dynamoelectric machine as set forth in claim 2, wherein said clamp means include a pair of end bolted plates and means for separating the central portions of said plates thereby adjusting the radial dimension of said clamping plates, and means for clamping said clamping plates together.

11. A rotor for a vertical waterwheel dynamoelectric machine as set forth in claim 3, wherein said clamp means include a pair of end bolted clamping plates and means for separating the central portions of said clamping plates thereby adjusting the radial dimension of said clamping plates, and means for clamping said clamping plates together.

12. A rotor for a waterwheel dynamoelectric machine as set forth in claim 2, wherein said plate means include a radially extending plate having said spider support portion for said clamp means and further include a transverse arm plate extending outwardly between each opposed arm pair, and wherein said clamp means include a pair of end bolted clamping plates extending in the radial dimension and supported adjacent an inner end thereof in a slot in said radially by extending plate and supported adjacent an outer end thereof in an inwardly facing slot in said rim member, means for separating the central portions of said clamping plates thereby adjusting the radial dimension of said clamping plates, and means for clamping said clamping plates together.

13. A rotor for a waterwheel dynamoelectric machine as set forth in claim 2, wherein said plate means include a radially extending plate having said spider support portion for said clamp means and further include a transverse arm plate extending outwardly between each opposed arm pair, and wherein said clamp means include a pair of end bolted clamping plates extending in the radial dimension and supported adjacent an inner end thereof in a slot in said radially by extending plate and supported adjacent an outer end thereof in an inwardly facing slot in said rim member, at least one jack bolt for separating the central portions of said clamping plates thereby adjusting the radial dimension of said clamping plates, a structural beam extending radially of said clamping plates and means for securing said clamping plates together and for securing said structural beam to said clamping plates.

14. A rotor member for a dynamoelectric machine, said rotor member comprising an annular rim member and a spider member, the spider member having a plurality of generally radial arms and the rim member being disposed circumferentially about the ends of the spider arms, and means for securing the rim member to the spider member including a plurality of rigid clamping means extending radially between a portion of the spider member and the rim member, each of said clamping means engaging the spider member and the rim member and being radially extensible to apply a radial clamping force between the spider member and the rim member.

15. A rotor member for a dynamoelectric machine, said rotor member comprising an annular rim member and a spider member, the spider member having a plurality of generally radial arms and the rim member being disposed circumferentially about the ends of the spider arms, and means for securing the rim member to the spider member including a plurality of rigid clamping means extending radially between a portion of the spider member and the rim member, each of said clamping means engaging the spider member and the rim member and comprising clamping members capable of being bowed sufficiently to permit insertion of the clamping means between the spider member and the rim member, and means for drawing the clamping members together to effect radial extension of the clamping means to apply a radial clamping force between the spider member and the rim member.

References Cited by the Examiner

UNITED STATES PATENTS 3,046,426   7/1962   Gynt _____ 310—265 X

FOREIGN PATENTS 345,698   4/1931   Great Britain.

MILTON O. HIRSHFIELD, *Primary Examiner.*

J. J. SWARTZ, *Assistant Examiner.*